United States Patent
Mitsumoto et al.

(10) Patent No.: US 12,228,187 B2
(45) Date of Patent: Feb. 18, 2025

(54) FRICTION MATERIAL COMPOSITION, FRICTION MATERIAL AND FRICTION MEMBER

(71) Applicants: Showa Denko Materials Co., Ltd., Tokyo (JP); NISSAN MOTOR CO., LTD., Kanagawa (JP)

(72) Inventors: Masamichi Mitsumoto, Tokyo (JP); Yoshio Ogata, Atsugi (JP); Mitsushi Oyanagi, Atsugi (JP)

(73) Assignees: RESONAC CORPORATION, Tokyo (JP); NISSAN MOTOR CO., LTD., Kanagawa (JP)

( * ) Notice: Subject to any disclaimer, the term of this patent is extended or adjusted under 35 U.S.C. 154(b) by 181 days.

(21) Appl. No.: 17/310,255

(22) PCT Filed: Jan. 28, 2020

(86) PCT No.: PCT/JP2020/002986
§ 371 (c)(1),
(2) Date: Jul. 27, 2021

(87) PCT Pub. No.: WO2020/158735
PCT Pub. Date: Aug. 6, 2020

(65) Prior Publication Data
US 2024/0026944 A1    Jan. 25, 2024

(30) Foreign Application Priority Data
Jan. 28, 2019 (JP) .................................. 2019-012381

(51) Int. Cl.
*F16D 69/02* (2006.01)
*F16D 69/04* (2006.01)

(52) U.S. Cl.
CPC .... *F16D 69/026* (2013.01); *F16D 2069/0466* (2013.01); *F16D 2200/0008* (2013.01); *F16D 2200/0052* (2013.01); *F16D 2200/0065* (2013.01)

(58) Field of Classification Search
CPC ........... F16D 69/026; F16D 2200/0008; F16D 2200/0052; F16D 2200/0065; F16D 2069/0466
See application file for complete search history.

(56) References Cited

U.S. PATENT DOCUMENTS

| | | | |
|---|---|---|---|
| 2002/0086159 A1 | 7/2002 | Horiya et al. | |
| 2018/0031067 A1 | 2/2018 | Unno et al. | |

FOREIGN PATENT DOCUMENTS

| | | |
|---|---|---|
| CN | 103119121 A | 5/2013 |
| CN | 107001915 A | 8/2017 |
| CN | 108495905 A | 9/2018 |
| JP | 2002-138273 A | 5/2002 |
| JP | 2015-004037 A | 1/2015 |
| JP | 2016-074812 A | 5/2016 |
| JP | 2017-002186 A | 1/2017 |
| JP | 2018-131479 A | 8/2018 |
| WO | 2016/125892 A1 | 8/2016 |
| WO | 2018/163256 A1 | 9/2018 |

*Primary Examiner* — Patrick D Niland
(74) *Attorney, Agent, or Firm* — FITCH, EVEN, TABIN & FLANNERY, LLP

(57) ABSTRACT

To provide a friction material composition which provides a friction material having high friction coefficient during high speed and high temperature braking, high coefficient of static friction and excellent abrasion resistance at high temperature and causing little sticking due to rust, even when the composition includes no antimony element or no copper element, or includes less than 0.5% by mass of copper element if any, in other words even when having a composition environmentally less harmful or less harmful to the human body. More specifically the friction material composition includes a bonding material, an organic filler, an inorganic filler and a fiber substrate, wherein the friction material composition includes no copper element, or includes less than 0.5% by mass of copper element if any, includes no antimony element, includes 5% by mass or less of iron fiber, 1 to 5% by mass of zinc powder, 2.5 to 6% by mass of calcium hydroxide, 0.7 to 1.5% by mass of sodium carbonate and a silicone-containing phenolic resin.

19 Claims, No Drawings

FRICTION MATERIAL COMPOSITION, FRICTION MATERIAL AND FRICTION MEMBER

CROSS-REFERENCE TO RELATED APPLICATIONS

This application is a U.S. national phase application filed under 35 U.S.C. § 371 of International Application No. PCT/JP2020/002986, filed Jan. 28, 2020, designating the United States, which claims priority from Japanese Application No. 2019-012381, filed Jan. 28, 2019, which are hereby incorporated herein by reference in their entirety.

TECHNICAL FIELD

The present invention relates to a friction material composition suitable for a friction material used for automobile braking, such as disc brake pads and brake linings, a friction material and a friction member using the friction material composition. In particular, the friction material composition does not contain asbestos, and relates to what is called a non-asbestos friction material.

BACKGROUND ART

Friction materials such as disc brake pads and brake linings are used for braking in automobiles and the like. Such friction materials including disc brake pads and brake linings make friction with a disc rotor or a brake drum, which is a mating material, to play a role as a brake. Thus, friction materials are required not only to have friction coefficient appropriate for the condition of use (braking properties) but also to cause little brake squeal (squeal properties) and have long life (abrasion resistance).

Friction materials are roughly classified into (1) semi-metallic materials including 30 to 60% by mass of steel fiber as a fiber substrate, (2) low steel materials including less than 30% by mass of steel fiber and (3) NAO (Non-Asbestos-Organic) materials including little steel-based fiber such as steel fiber or stainless steel fiber. Friction materials containing a small amount of steel fiber are sometimes classified into NAO materials.

Since NAO materials do not contain the above steel-based fiber or contain an extremely small amount of the steel-based fiber, they are less likely to attack disc rotors, which are a mating material, compared with semi-metallic materials or low steel materials. This advantage has made the NAO material having balanced braking, squeal and abrasion resistance the mainstream in Japan and the United States. Furthermore, although low steel materials have been frequently used in Europe from the viewpoint of secured friction coefficient in braking at high speed, use of NAO materials which cause little contamination of wheels of tires and little brake squeal has been increased to respond to the recent high-end market.

Another defect of semi-metallic materials and low steel materials is rust resistance. Disc rotors, which are a mating material of friction materials, are generally made of cast iron, and thus are rusted by rainwater or snow melting agent. As a result, excessive rust formed on the interface of friction may cause, for example, brake squeal, or the disc rotor may stick to the friction material (sticking due to rust), making the car not start, and friction materials may be peeled off at the start. Semi-metallic materials and low steel materials which contain a large amount of steel fiber in the friction material are obviously disadvantageous in the above problem.

When a brake pad is used for rear wheels of an automobile, in some cases the brake pad is used not only in travelling of the automobile but also holding of the vehicle in parking (parking brake). Those cases require high coefficient of static friction that can hold the vehicle even when the vehicle is parked, for example, on a slope. This feature is more important for electric parking brake which will be widespread in the future. Examples of materials which increase the coefficient of static friction include hard particles having grinding force and iron fiber and copper fiber having metallic adhesion force. Hard particles, however, have the problem of excessive grinding of disc rotors in braking. Furthermore, iron fiber causes the above problem of sticking due to rust when added in a large amount.

Copper fiber has been widely used for NAO materials as an essential component. Since copper fiber has high melting point, thermal conductivity and ductility, they form film on the interface of friction, and this feature significantly contributes to maintaining friction coefficient during high speed and high temperature braking and suppression of abrasion. However, since copper- or copper alloy-containing friction materials contain copper in the friction powder, possibility of pollution of river and lakes have been suggested. Then a bill which bans sales and incorporation into new cars of friction materials containing 5% by mass or more of copper after 2021 and friction materials containing 0.5% by mass or more of copper after 2025 has been passed in the state of California and Washington in the United States. Thus to respond to the situation, development of an NAO material containing no or little copper is an urgent task.

This trend has led to proposal of, for example, (i) a friction material for brake, comprising a fiber component, a bonding component and a component for adjusting friction, wherein the friction material comprises 45 to 80% by volume of magnesium oxide and graphite and the volume ratio of magnesium oxide to graphite (MgO/graphite) is 1/1 to 4/1 (see PTL 1); and (ii) a friction material which is used for a disc brake pad and prepared by molding a friction material composition, wherein the friction material composition comprises 1 to 15% by weight of ferrous sulfide particles as a lubricant based on the total amount of the friction material composition and the total amount of a copper component in the friction material composition is less than 5% by weight based on the total amount of the friction material composition (see PTL 2).

CITATION LIST

Patent Literature

PTL 1: JP 2002.138273 A
PTL 2: JP 2015.004037 A

SUMMARY OF INVENTION

Technical Problem

In recent years, an important issue different viewpoint from the above regulation of copper has been raised. It is compatibility with regenerative cooperative brake which has become popular these days. Since disc rotors are usually made of cast iron as described above, they are rusted due to rainwater and snow melting agent. In conventional hydraulic brake systems, friction with the brake pad in braking has allowed rust on the surface of the disc rotor to be removed to some extent. However, in regenerative cooperative brake, regenerative brake is responsible for part of braking, and thus the proportion of braking using friction between a brake pad and a disc rotor is reduced. As a result, rust generated on the surface of the disc rotor may not be thoroughly removed.

Problems caused by rust include squeal and vibration in braking and sticking due to rust. In particular, when a brake pad is used in parking brake, the pad is left pressed against the disc rotor for long time, and thus sticking due to rust is particularly likely to occur. Therefore, a brake pad which hardly causes sticking due to rust is strongly desired for the regenerative cooperative brake which will become more widespread in the future.

The object of PTLs 1 and 2 is to merely complement, using different components, friction properties during high speed and high temperature braking provided by high thermal conductivity and lubricity at high temperature of copper; and an improvement of coefficient of static friction and reduction of sticking due to rust is not taken into consideration.

In PTL 1, it is essential that the total amount of magnesium oxide, which is an abrasive, and graphite, which is a lubricant, to be added is as high as 45 to 80% by volume, and thus balanced improvement of friction properties is difficult.

Furthermore, in PTL 2, by including 1 to 15% by mass of ferrous sulfide and 0.3 to 5% by mass of flaky graphite having an average particle size of 1 to 100 μm instead of copper to complement lubricity at high temperature, friction coefficient and abrasion resistance in braking at high speed and high load have been improved. However, it is difficult to improve coefficient of static friction and reduce sticking due to rust.

Moreover, although antimony compounds such as antimony trisulfide and antimony trioxide have been commonly used as a high temperature lubricant different from copper, adding them to a friction material is not desired because they are harmful to the human body.

Thus, an object of the present invention is to provide a friction material composition which provides a friction material having high friction coefficient during high speed and high temperature braking, high coefficient of static friction and excellent abrasion resistance at high temperature and causing little sticking due to rust, even when the composition comprises no antimony element or no copper element, or comprises less than 0.5% by mass of copper element if any, in other words even when having a composition environmentally less harmful or less harmful to the human body.

Solution to Problem

The present inventors have conducted intensive studies and as a result have found that a friction material composition comprising a predetermined amount of iron fiber, 1 to 5% by mass of zinc powder, 2.5 to 6% by mass of calcium hydroxide, 0.7 to 1.5% by mass of sodium carbonate and a silicone-containing phenolic resin solves the above problem.

More specifically, the present invention relates to the following [1] to [8].

[1] A friction material composition comprising a bonding material, an organic filler, an inorganic filler and a fiber substrate, wherein the friction material composition comprises no copper element, or comprises less than 0.5% by mass of copper element if any, comprises no antimony element, comprises iron fiber and the content thereof is 5% by mass or less, comprises 1 to 5% by mass of zinc powder, comprises 2.5 to 6% by mass of calcium hydroxide, comprises 0.7 to 1.5% by mass of sodium carbonate and comprises silicone-containing phenolic resin.

[2] The friction material composition according to the above [1], wherein the content of the iron fiber is 0.5 to 5% by mass.

[3] The friction material composition according to the above [1] or [2], comprising cashew particles as the organic filler.

[4] The friction material composition according to any of the above [1] to [3], comprising a rubber ingredient as an organic filler.

[5] The friction material composition according to any of the above [1] to [4], comprising at least one selected from the group consisting of titanate, zirconium oxide, graphite and metal sulfide as the inorganic filler.

[6] A friction material prepared by molding the friction material composition according to any of the above [1] to [5].

[7] The friction material according to the above [6], wherein the friction material has a porosity of 5 to 18%.

[8] A friction member comprising the friction material according to the above [7] and a back metal.

Advantageous Effect of Invention

The present invention can provide a friction material composition which provides a friction material environmentally less harmful or less harmful to the human body and having high friction coefficient during high speed and high temperature braking, high coefficient of static friction and excellent abrasion resistance at high temperature and causing little sticking due to rust when used as a friction material such as disc brake pads and brake linings for automobiles.

DESCRIPTION OF EMBODIMENTS

Hereinafter the present invention will be described in detail. The elements in the following embodiments are not essential unless explicitly described. The same applies to the numerical value and range, and they do not limit the present invention.

The upper limit and the lower limit of the numerical ranges described in the present description may be replaced with the value shown in Examples. Furthermore, in the present description, when there are a plurality of types of substances for the components of the friction material composition, the content of the components in the friction material composition means the sum of the contents of those substances unless otherwise specified.

Furthermore, the present invention includes embodiments optionally combining the matters described in the present description.

Hereinafter the friction material composition, the friction material and the friction member using the composition of the present invention will be described in detail. The friction material composition of the present invention does not contain asbestos, and thus is what is called a non asbestos friction material composition.

[Friction Material Composition]

The friction material composition of the present invention comprises a bonding material, an organic filler, an inorganic filler and a fiber substrate, wherein the friction material composition comprises no copper element, or comprises less than 0.5% by mass of copper element if any, comprises no antimony element, comprises 5% by mass or less of iron fiber, 1 to 5% by mass of zinc powder, 2.5 to 6% by mass of calcium hydroxide, 0.7 to 1.5% by mass of sodium carbonate and a silicone-containing phenolic resin.

The above "copper element" refers to the copper element in copper, copper alloy and a copper compound in the form of, for example, fiber or powder. The content of the copper element means the content in the whole friction material composition. Furthermore, the above "antimony element" refers to the antimony element in antimony compounds such as antimony sulfide and antimony oxide. The content means the content in the whole friction material composition.

The friction material composition of the present invention provides a friction material having high friction coefficient during high speed and high temperature braking, high coefficient of static friction and excellent abrasion resistance at high temperature and causing little sticking due to rust, even when the composition comprises no antimony element or no copper element, or comprises less than 0.5% by mass of copper element if any, in other words even though the composition is environmentally less harmful and less harmful to the human body. In this regard, the "during high speed and high temperature braking" means braking in the condition in which a car is running at a speed of 200 to 300 km/h and the temperature of the disc rotor is 300 to 600° C. when the brake is applied. Furthermore, the "abrasion resistance at high temperature" refers to abrasion resistance at a temperature of, for example, about 300 to 600° C. (more specifically 350 to 450° C.).

Hereinafter the components to be included in the friction material composition of the present invention will be described.

(Bonding Material)

The bonding material has the function of integrating organic filler and fiber substrate in the friction material composition to produce strength. In the present invention, at least silicone-containing phenolic resin is used as a bonding material. It is preferable to use a phenolic resin in which silicone oil or silicone rubber is dispersed as the silicone-containing phenolic resin. Use of the silicone-containing phenolic resin leads to increase of water repellency on the interface of friction, making friction coefficient stable even after the composition is left in a high humidity condition.

As the bonding material, the silicone-containing phenolic resin may be used alone or in combination with another bonding material. Examples of other bonding materials include phenolic resins such as acrylic rubber-containing phenolic resin, cashew-modified phenolic resin, epoxy-modified phenolic resin and alkyl benzene-modified phenolic resin. These bonding materials may also be used alone or two or more of them may be used in combination.

The content of the bonding material in the friction material composition is preferably 5 to 20% by mass, more preferably 5 to 15% by mass, and further preferably 5 to 10% by mass. An embodiment in which the content of the silicone-containing phenolic resin in the friction material composition is in the above range is also particularly preferred. When the content of the bonding material is the lower limit or more, reduction of the strength of the friction material tends to be suppressed more. When the content of the bonding material is the upper limit or less, degradation of sound and vibration performance such as squeal due to reduction of porosity and increase of elastic modulus of the friction material tends to be suppressed.

(Organic Filler)

The organic filler is included as an agent for adjusting friction which improves sound and vibration performance and abrasion resistance of the friction material.

Organic fillers usually used in friction material compositions may be used as the organic filler. Examples thereof include cashew particles, rubber ingredient and melamine dust. Of them, cashew particles and rubber ingredient are preferred from the viewpoint of improvement of stability of friction coefficient and abrasion resistance and suppression of squeal.

Cashew particles may be those usually used for a friction material, which are prepared by crushing a product prepared by polymerizing and curing cashew nut oil.

When the friction material composition of the present invention contains cashew particles, the content is preferably 1 to 10% by mass, more preferably 1 to 8% by mass, and further preferably 3 to 7% by mass. When the content of the cashew particle is the lower limit or more, degradation of sound and vibration performance such as squeal due to increase of elastic modulus of the friction material tends to be suppressed. When the content of the cashew particle is the upper limit or less, degradation of heat resistance and reduction of strength due to heat history tends to be suppressed.

Examples of the rubber ingredient include tire rubber, acrylic rubber, isoprene rubber, NBR (nitrile butadiene rubber) and SBR (styrene butadiene rubber). The rubber ingredient may be used alone or in combination of two or more types.

When the friction material composition of the present invention contains the rubber ingredient, the content is preferably 0.1 to 5% by mass, and more preferably 0.5 to 3% by mass.

When the cashew particle and the rubber ingredient are used in combination, cashew particles coated with the rubber ingredient may be used, or they may be used individually.

The content of the organic filler in the friction material composition of the present invention is preferably 1 to 20% by mass, more preferably 1 to 15% by mass, and further preferably 2 to 10% by mass. When the content of the organic filler is the lower limit or more, degradation of sound and vibration performance such as squeal due to increase of elastic modulus of the friction material tends to be suppressed. When the content of the organic filler is the upper limit or less, degradation of heat resistance and reduction of strength due to heat history tends to be suppressed.

(Inorganic Filler (Calcium Hydroxide, Sodium Carbonate))

The friction material composition of the present invention comprises an inorganic filler. The inorganic filler has the function of adjusting friction coefficient of the friction material and improving heat resistance and improving the effect of preventing sticking due to rust. The inorganic filler varies in the component, particle size, hardness and forms. The friction material composition of the present invention contains at least 2.5 to 6% by mass of calcium hydroxide and 0.7 to 1.5% by mass of sodium carbonate as an inorganic filler. The content of the calcium hydroxide is preferably 2.8 to 6% by mass, more preferably 3 to 5% by mass, and further preferably 3 to 4% by mass. The content of sodium carbonate is preferably 0.8 to 1.2% by mass, and more preferably 0.8 to 1.0% by mass. When the content of calcium hydroxide and sodium carbonate is in the respective ranges, friction coefficient during high speed and high temperature braking is maintained and sticking due to rust is prevented simultaneously.

(Other Inorganic Fillers)

Titanate, zirconium oxide, magnesium oxide, zirconium silicate, calcium silicate, metal sulfide, calcium oxide, calcium carbonate, magnesium carbonate, barium sulfate, dolomite, graphite, coke, mica, iron oxide, vermiculite, calcium sulfate, talc, clay, zeolite, α-alumina, γ-alumina, mullite, chromite, titanium oxide and silica may be, for example, used as the inorganic filler in addition to calcium hydroxide and sodium carbonate. One of them may be used alone or two or more of them may be used in combination.

Of them, at least one selected from the group consisting of titanate, zirconium oxide, graphite and metal sulfide is preferably included as the other inorganic filler.

(Titanate)

Titanate has a Mohs hardness of as low as about 4 and a relatively high melting point of 1,000° C. or more, and thus abrasion resistance of the friction material can be improved when titanate is interposed on the interface of friction during high speed and high temperature braking. Furthermore, titanate has the effect of improving stability of friction coefficient.

At least one selected from the group consisting of potassium titanate (potassium 6-titanate, potassium 8-titanate), lithium potassium titanate, magnesium potassium titanate and sodium titanate is preferably included. At least one selected from the group consisting of potassium titanate and lithium potassium titanate is more preferably included, and potassium titanate is further preferred.

The form of titanate is not particularly limited, and a non-needle form is preferred to avoid harmful effects to the human body. The non-needle titanate means plate-like titanate having a polygonal, circular or elliptic form; flaky titanate; columnar titanate; and amorphous titanate. Of them, flaky titanate is preferred.

The form of titanate may be analyzed, for example, by observation with a scanning electron microscope (SEM).

The average particle size of titanate is not particularly limited, and is preferably 1 to 50 μm, more preferably 1.5 to 40 μm, and further preferably 2.0 to 30 μm.

In the present description, the average particle size means the value of d50 (the median particle size of the cumulative volume distribution) measured by using laser diffraction particle size distribution measurement. The same applies below. The average particle size may be measured, for example, by a laser diffraction/scattering particle size analyzer, trade name LA-920 (made by HORIBA, Ltd.).

When the friction material of the present invention includes titanate, the content is preferably 0.5 to 30% by mass, more preferably 1 to 20% by mass, further preferably 5 to 20% by mass, and particularly preferably 10 to 20% by mass based on the total amount of the friction material. When the content of titanate is the lower limit or more, abrasion resistance tends to be improved. When the content of titanate is the upper limit or less, reduction of friction coefficient tends to be suppressed.

(Zirconium Oxide)

Zirconium oxide has a Mohs hardness of about 7, and thus functions as a grinding material.

The average particle size of zirconium oxide is not particularly limited, and zirconium oxide has an average particle size of preferably 1 to 14 μm, and more preferably 5 to 10 μm.

When the friction material of the present invention includes zirconium oxide, the content is preferably 5 to 20% by mass, and more preferably 10 to 18% by mass based on 100% by mass of the whole friction material. When the content of zirconium oxide is the above lower limit or more, the friction material tends to have excellent friction coefficient during high speed and high temperature braking and coefficient of static friction. When the content of zirconium oxide is the above upper limit or less, abrasion of the disc rotor, which is a mating material, tends to be easily suppressed.

(Graphite)

It is preferable that the friction material of the present invention includes graphite. Graphite serves as a lubricant, and when the friction material includes graphite, abrasion resistance of the friction material is improved. Furthermore, graphite may improve thermal conductivity of the friction material. The type of graphite is not particularly limited, and any known graphite such as natural graphite and artificial graphite may be used.

The average particle size of graphite is not particularly limited, and graphite has an average particle size of preferably 50 to 1,000 μm, more preferably 80 to 800 μm, and further preferably 100 to 800 μm. Two or more types of graphite having a different average particle size may be used in combination. When the average particle size of graphite is the lower limit or more, excessive increase in thermal conductivity tends to be suppressed, and thus occurrence of vapor lock due to transfer of friction heat to the back plate tends to be suppressed. Furthermore, the average particle size at the upper limit or less tends to improve thermal conductivity, facilitate curing of the bonding material during molding, and thus increase the strength of the friction material.

When the friction material of the present invention includes graphite, the content is preferably 0.5 to 20% by mass, more preferably 1 to 15% by mass, further preferably 1 to 10% by mass, and particularly preferably 2 to 7% by mass based on the total amount of the friction material. When the content of graphite is the lower limit or more, abrasion resistance tends to be improved and thermal conductivity tends to be easily improved. When the content of graphite is the upper limit or less, excessive increase in thermal conductivity tends to be suppressed and reduction of friction coefficient tends to be easily suppressed.

(Metal Sulfide)

Examples of metal sulfides include bismuth sulfide, tin sulfide, molybdenum disulfide, iron sulfide, zinc sulfide, tungsten sulfide and manganese sulfide. At least one selected from the group consisting of them is preferred. In the present invention, the metal sulfide does not include antimony trisulfide.

Tin sulfide is preferred as the metal sulfide from the viewpoint of abrasion resistance.

When the friction material of the present invention includes metal sulfide, the content is preferably 0.1 to 10% by mass, more preferably 0.5 to 6% by mass, further preferably 1 to 5% by mass, and particularly preferably 2 to 4% by mass based on the total amount of the friction material. When the content of the metal sulfide is the lower limit or more, abrasion of rotors tends to be suppressed. When the content of the metal sulfide is the upper limit or less, reduction of friction coefficient tends to be suppressed.

The total content of the inorganic filler is preferably 20 to 80% by mass, more preferably 30 to 80% by mass, and further preferably 40 to 80% by mass in the friction material composition. When the total content of the inorganic filler is in the above range, degradation of heat resistance tends to be prevented.

(Fiber Substrate)

The fiber substrate has the function of reinforcing the friction material. Examples of the fiber substrate include organic fiber, inorganic fiber and metal fiber.

Examples of organic fibers include aramid fiber, acrylic fiber, cellulose fiber and phenolic resin fiber. One of the organic fibers may be used alone, or two or more of them may be used in combination. Of them, aramid fiber is preferably used from the viewpoint of heat resistance and reinforcing effects.

Wollastonite, ceramic fiber, biodegradable ceramic fiber, mineral fiber, carbon fiber, glass fiber, potassium titanate fiber and aluminosilicate fiber may be used as the inorganic fiber. One of the inorganic fibers may be used alone, or two or more of them may be used in combination. It is preferable that potassium titanate fiber and the like presenting inhalation risk are not included because they are hazardous to the human body.

The above mineral fiber means an artificial inorganic fiber prepared by melt spinning blast furnace slag such as slag wool, basalt such as basalt fiber and other natural rocks as the main component. The mineral fiber is more preferably a natural mineral containing the Al element. More specifically, those containing $SiO_2$, $Al_2O_3$, CaO, MgO, FeO, $Na_2O$ and/or the like and those containing one or two or more of these compounds may be used as the mineral fiber. Mineral fiber containing the aluminum element is preferred, mineral fiber containing $Al_2O_3$ is more preferred, and mineral fiber containing $Al_2O_3$ and $SiO_2$ is further preferred.

It is preferable that the mineral fiber is biosoluble in order to avoid harmful effects to the human body. Herein the biosoluble mineral fiber means those part of which is decomposed and discharged to the outside of the human body in short time even when incorporated into the body. More specifically, the biosoluble mineral fiber refers to a fiber in which the total amount of alkali oxide and alkaline earth oxide (the total amount of oxide of sodium, potassium, calcium, magnesium and barium) is 18% by mass or more in the chemical composition and which satisfies one of the following conditions: (a) a short-term biopersistence test by inhalation has shown that the fibers longer than 20 μm have a weighted half-life less than 10 days; (b) short-term biopersistence test by intratracheal instillation has shown that the fibres longer than 20 μm have a weighted half-life less than 40 days; (c) an appropriate intra-peritoneal test has shown no evidence of excess carcinogenicity; and (d) absence of relevant pathogenicity or neoplastic changes in a long term inhalation test (see Note Q of EU Directive 97/69/EC (exemption from carcinogenicity)). Examples of such biodegradable mineral fibers include $SiO_2$—$Al_2O_3$—CaO—MgO—FeO(—$K_2O$—$Na_2O$) fibers and mineral fibers containing, in any combination, at least two selected from the group consisting of $SiO_2$, $Al_2O_3$, CaO, MgO, FeO, $K_2O$, $Na_2O$, and the like.

The friction material composition of the present invention includes iron fiber as metal fiber, and the content of the iron fiber is 5% by mass or less. Disc rotors are generally made of cast iron, and thus addition of iron fiber to the friction material provides the effect of adhering metal, and dynamic friction coefficient during high speed and high temperature braking and coefficient of static friction can be improved. The content of the iron fiber is preferably 0.5 to 5% by mass, more preferably 1 to 5% by mass, further preferably 1.5 to 4.5% by mass, and particularly preferably 2 to 4% by mass. When the content of the iron fiber is 0.5% by mass or more, coefficient of static friction and dynamic friction coefficient during high speed and high temperature braking tend to be more effectively improved. When the content of the iron fiber is higher than the above upper limit, sticking due to rust is increased and the material attacks the mating material more.

Including iron fiber in the friction material composition in the above content improves dynamic friction coefficient during high speed and high temperature braking and coefficient of static friction, but inclusion of iron fiber usually has a harmful effect of being more likely to cause sticking due to rust. In the present invention, by further including a predetermined amount of zinc powder and calcium hydroxide, and a silicone-containing phenolic resin, occurrence of sticking due to rust has been successfully suppressed while dynamic friction coefficient during high speed and high temperature braking and coefficient of static friction are improved. As described later, the effect of suppressing occurrence of sticking due to rust has been improved also by setting the porosity of the friction material at a predetermined range.

Examples of metal fibers other than iron fiber include titanium fiber, zinc fiber and aluminum fiber. One of them may be used alone, or two or more of them may be used in combination.

The friction material composition contains preferably 5 to 40% by mass, more preferably 5 to 35% by mass, further preferably 6 to 30% by mass, and particularly preferably 6 to 20% by mass of the fiber substrate. When the content of the fiber substrate is in the above range, appropriate effects of reinforcement is given to the friction material without harmful effects such as significant reduction of braking properties.

(Metal Powder (Zinc Powder))

The friction material composition of the present invention contains at least 1 to 5% by mass of zinc powder as a metal powder. Zinc is more easily ionized than iron, and thus is more likely to be oxidized than iron. Therefore, when a friction material contains zinc powder, iron fiber in the friction material, the disc rotor, and abrasion powder in the disc rotor are less likely to be rusted on the interface, and thus sticking due to rust is reduced. The content of zinc powder in the friction material composition is 1 to 4.5% by mass, more preferably 1 to 4% by mass, and further preferably 1 to 3% by mass. When the content of the zinc powder is in the above range, sticking due to rust is prevented and abrasion at high temperature (e.g., 300° C. or more) are ensured simultaneously.

Examples of metal powders other than zinc powder include iron powder, tin powder, aluminum powder and alloy powder containing at least one metal selected from the group consisting of iron, tin and aluminum. One of the metal powders other than zinc powder may be used alone, or two or more of them may be used in combination. The friction material composition of the present invention may or may not contain a metal powder other than zinc powder. When the friction material composition of the present invention contains a metal powder other than the zinc powder, the content is not particularly limited as long as the effect of the present invention is not reduced, and is preferably 5% by mass or less, more preferably 3% by mass or less, further preferably 1% by mass or less, and particularly preferably 0.5% by mass or less.

The particle size, the form and the like of the metal powder are not limited as long as they do not cause a significant degradation of properties. The powder may have, for example, a spherical form, which is prepared by a usual atomization method, or may have a columnar form, which is prepared by a usual cutting method. Furthermore, although the purity of the metal is preferably 90% or more, the surface of the metal powder may be changed to metal oxide and the like due to, for example, long term storage of the metal powder and the friction material composition.

(Other Components)

Ingredients other than the above ingredients may also be blended into the friction material composition of the present invention as needed.

[Friction Material and Friction Member]

The friction material composition of the present invention may be used as a friction material for disc brake pads and brake linings for automobiles. The friction material composition of the present invention may be subjected to the step of molding, processing and/or pasting to be used as a friction material for clutch facing, an electromagnetic brake and a holding brake.

The present invention also provides a friction material prepared by molding the friction material composition of the present invention. The friction material may form the friction surface. Examples of structures of the friction member of the present invention include the following structures.

(1) A structure consisting only of a friction material.
(2) A structure including a back metal and the friction material formed on the back metal.
(3) A structure in which at least one of a primer layer for surface modification to increase adhesiveness to the back metal and an adhesive layer for bonding the back metal and the friction member is further interposed between the back metal and the friction material in the above structure (2). Of them, the structures (2) and (3) (i.e., a friction member comprising the friction material of the present invention and a back metal) are preferred, and the structure (3) is more preferred.

A back metal usually used for a friction member may be used in order to improve mechanical strength of the friction member. Examples of materials of the back metal include metal and fiber-reinforced plastic, which are more specifically iron, stainless steel, inorganic fiber-reinforced plastic and carbon fiber-reinforced plastic. The primer layer and the adhesive layer may be those usually used for a friction member such as a brake shoe.

The friction material composition of the present invention may be produced by a method usually used. More specifically, the friction material may be produced by heat and pressure molding of the friction material composition of the present invention. The friction material composition of the present invention is, for example, mixed thoroughly by using a mixer such as Loedige mixer ("Loedige" is a registered trademark), a pressure kneader, or EIRICH mixer ("EIRICH" is a registered trademark), and the mixture is premolded using a molding die, and the resulting premolded article is molded under conditions of a molding temperature of 130 to 160° C., a molding pressure of 20 to 50 MPa and a molding time of 2 to 10 minutes, and the resulting molded article is heated at 150 to 250° C. for 2 to 10 hours to obtain a friction material. The material may be painted, scorched and/or polished as necessary.

(Porosity)

The porosity of the friction material of the present invention is preferably 5 to 18%, more preferably 8 to 18%, and further preferably 8 to 13%. When the porosity of the friction material is in the above range, sticking due to rust is less likely to occur. The porosity is measured according to JIS D4418 (1996). The porosity may be modified by controlling the condition of producing the friction material. In particular, the porosity can be easily controlled by the molding pressure, the molding temperature and the molding time in the molding step. More specifically, the porosity can be reduced by increasing the molding pressure and the molding temperature and increasing the molding time. By contrast, the porosity can be increased by reducing the molding pressure and the molding temperature and reducing the molding time.

The friction material composition of the present invention has excellent friction coefficient during high speed and high temperature braking and excellent abrasion resistance at high temperature (e.g., 300° C. or more), and thus is useful as an "overlay material" for a friction member such as a disc brake pad and brake lining. The friction material composition of the present invention may also be molded to be used as an "underlay material" for a friction member.

The "overlay material" refers to a friction material forming the friction surface of a friction member. The "underlay material" refers to a layer interposed between a friction material forming the friction surface of a friction member and a back metal, which is provided in order to improve shear strength and crack resistance around the portion at which the friction member is bonded to the back metal.

EXAMPLES

The present invention will be described in more detail with reference to Examples. The present invention is not limited thereto.

Examples 1 to 7, Comparative Examples 1 to 10 and Reference Example 1>

[Fabrication of Disc Brake Pads]

Ingredients were blended in the amount blended shown in Table 1 and Table 2 to obtain the friction material compositions of the respective Examples.

The friction material composition obtained in the respective examples was mixed by "Loedige (registered trademark) mixer M20" (tradename, manufactured by MATSUBO Corporation). The mixture was premolded by a molding press (manufactured by Oji Machine Co., Ltd.) and the resulting premolded article was heat and press molded together with a back metal (made of iron) manufactured by Hitachi Automotive Systems, Ltd. under conditions of a molding temperature of 145° C., a molding pressure of 35 MPa and a molding time of 5 minutes using a molding press (manufactured by SANKI SEIKO CO., LTD.). The obtained molded article was heat-treated at 200° C. for 4.5 hours and polished using a rotary polisher to obtain a disc brake pad (thickness of friction material 8.5 mm, projection area of friction material 25 cm$^2$).

The ingredients used in the respective Examples are as follows.

[Bonding Material]
  Resin A (silicon-containing phenolic resin); RX2325C (tradename) manufactured by Mitsui Chemicals, Inc.
  Resin B (phenolic resin); HP491UP (tradename) manufactured by Hitachi Chemical Co., Ltd.

[Organic Filler]
  Cashew particles
  Rubber ingredient: tire rubber powder

[Inorganic Fillers]
  Potassium titanate
  Graphite
  Zirconium oxide
  Antimony trisulfide
  Tin sulfide
  Calcium hydroxide Sodium carbonate
Barium sulfate
[Fiber Substrate]
  Copper fiber (metal fiber)
  Iron fiber (metal fiber)
  Aramid fiber (organic fiber)
  Mineral fiber (inorganic fiber)
[Metal Powder]
  Zinc powder Properties of the disc brake pad of the respective examples fabricated by the above method were evaluated by using a brake dynamometer tester (made by Shin Nippon Tokki Co., Ltd.). The properties (excluding the porosity) were evaluated using vehicle parts under vehicle conditions of "Murano" (registered trademark) made by Nissan Motor Co., Ltd. The results are shown in Table 1 and Table 2.

(1. Porosity)

The porosity was measured according to JIS D4418 (1996).

(2. Friction Coefficient During High Speed and High Temperature Braking)

The test was performed at an environmental temperature of 25° C. and a humidity of 30% according to JASO C406. Braking at 245 km/h, 0.6 G (the temperature of the disc rotor being 500° C. at the start of braking) was added to the second effectiveness test, and the result was determined as the friction coefficient during high speed and high temperature braking.

Those having a friction coefficient during high speed and high temperature braking of 0.25 or more were rated as "A," excellent, those having a friction coefficient during high speed and high temperature braking of 0.20 or more and less than 0.25 were rated as "B," acceptable, and those having a friction coefficient during high speed and high temperature braking of less than 0.20 were rated as "C," failure.

(3. Coefficient of Static Friction)

The test was performed at an environmental temperature of 25° C. and a humidity of 30%. Test item a (the initial measurement) to test item f (the first reburnish) were performed, and then the coefficient of static friction was measured. The coefficient of static friction was calculated after applying a hydraulic pressure of 10 MPa while the vehicle was stopped from the torque at the start when the disc rotor was rotated at a rate of 1 rpm in the direction reverse to the burnish (the backward direction) and the hydraulic pressure (coefficient of static friction=torque at start/hydraulic pressure).

Those having a coefficient of static friction of 0.34 or more were rated as "A," excellent, those having a coefficient of static friction of 0.30 or more and less than 0.34 were rated as "B," acceptable, and those having a coefficient of static friction of less than 0.30 were rated as "C," failure.

(4. Amount of Abrasion of Pad at 400° C.)

In the test, the amount of abrasion of the disc pad at a temperature of the brake before braking of 400° C. was measured according to JASO C427. The abrasion resistance at a temperature of as high as 400° C. was evaluated based on the following criteria.

Those having an amount of abrasion of less than 1.00 mm were rated as "A," having excellent abrasion resistance, those having an amount of abrasion of 1.00 mm to 1.49 mm were rated as "B," acceptable, and those having an amount of abrasion of more than 1.50 mm were rated as "C," failure.

(5. Strength of Sticking Due to Rust)

In the test, test item d (burnish) of JASO C406 was performed under the condition of an environmental temperature of 25° C. and a humidity of 30%. The disc pad removed from the tester was dipped in 5% saline water for 15 minutes and then was placed on the sliding surface of a disc rotor fixed on a flat workbench. After 72 hours, the disc pad was pressed in the direction of sliding using a push pull gauge and the like, and the highest load measured when the pad was removed from the disc rotor was determined as the strength of sticking due to rust.

Those having a strength of sticking due to rust of 0 (zero) N were rated as "A," having an excellent effect of preventing sticking due to rust, those having a strength of sticking due to rust of more than 0 to less than 100 N were rated as "B," acceptable, and those having a strength of sticking due to rust of 100 N or more were rated as "C," failure.

TABLE 1

| | | | Examples | | | | | | |
|---|---|---|---|---|---|---|---|---|---|
| | | | 1 | 2 | 3 | 4 | 5 | 6 | 7 |
| Friction material composition | Bonding material | Resin A | 8 | 8 | 8 | 8 | 8 | 8 | 8 |
| | | Resin B | | | | | | | |
| | Organic filler | Cashew particle | 4 | 4 | 4 | 4 | 4 | 4 | 4 |
| | | Rubber ingredient | 1 | 1 | 1 | 1 | 1 | 1 | 1 |
| | Inorganic filler | Potassium titanate | 15 | 15 | 15 | 15 | 15 | 15 | 15 |
| | | Graphite | 4 | 4 | 4 | 4 | 4 | 4 | 4 |
| | | Zirconium oxide | 15 | 15 | 15 | 15 | 15 | 15 | 15 |
| | | Antimony trioxide | | | | | | | |
| | | Tin sulfide | 3 | 3 | 3 | 3 | 3 | 3 | 3 |
| | | Calcium hydroxide | 4 | 4 | 4 | 4 | 4 | 4 | 3 |
| | | Sodium carbonate | 1 | 1 | 1 | 1 | 1 | 1 | 0.8 |
| | | Barium sulfate | 33 | 31 | 32 | 32 | 31 | 31 | 33.2 |
| | Fiber substrate | Copper fiber (metal fiber) | | | | | | | |
| | | Iron fiber (metal fiber) | 2 | 4 | 4 | 3 | 3 | 3 | 4 |
| | | Aramid fiber (Organic fiber) | 3 | 3 | 3 | 3 | 3 | 3 | 3 |
| | | Mineral fiber (Inorganic fiber) | 5 | 5 | 5 | 5 | 5 | 5 | 5 |
| | Metal powder | Zinc powder | 2 | 2 | 1 | 2 | 3 | 3 | 1 |
| Results of measurement and evaluation | Porosity (%) | | 10 | 10 | 10 | 10 | 10 | 15 | 10 |
| | Friction coefficient during high speed and high temperature braking | | 0.21 / B | 0.26 / A | 0.27 / A | 0.24 / B | 0.22 / B | 0.24 / B | 0.27 / A |
| | Coefficient of static friction | | 0.31 / B | 0.36 / A | 0.35 / A | 0.32 / B | 0.32 / B | 0.33 / B | 0.35 / A |

TABLE 1-continued

|  |  | Examples | | | | | | |
|---|---|---|---|---|---|---|---|---|
|  |  | 1 | 2 | 3 | 4 | 5 | 6 | 7 |
| Amount of abrasion of pad at 400° C. | (mm) | 0.92 | 1.42 | 1.32 | 1.25 | 1.35 | 1.45 | 1.36 |
|  | — | A | B | B | B | B | B | B |
| Strength of sticking due to rust | (N) | 0 | 32 | 55 | 74 | 0 | 62 | 98 |
|  | — | A | B | B | B | A | B | B |

*The unit of the amount blended is part(s) by mass.

TABLE 2

|  |  |  | Comparative Examples | | | | | | | | | | Reference Example |
|---|---|---|---|---|---|---|---|---|---|---|---|---|---|
|  |  |  | 1 | 2 | 3 | 4 | 5 | 6 | 7 | 8 | 9 | 10 | 1 |
| Friction material composition | Bonding material | Resin A |  | 8 | 8 | 8 | 8 | 8 | 8 | 8 | 8 | 8 | 8 |
|  |  | Resin B | 8 |  |  |  |  |  |  |  |  |  |  |
|  | Organic filler | Cashew particle | 4 | 4 | 4 | 4 | 4 | 4 | 4 | 4 | 4 | 4 | 4 |
|  |  | Rubber ingredient | 1 | 1 | 1 | 1 | 1 | 1 | 1 | 1 | 1 | 1 | 1 |
|  | Inorganic filler | Potassium titanate | 15 | 15 | 15 | 15 | 15 | 15 | 15 | 15 | 15 | 15 | 15 |
|  |  | Graphite | 4 | 4 | 4 | 4 | 4 | 4 | 4 | 4 | 4 | 4 | 4 |
|  |  | Zirconium oxide | 15 | 15 | 15 | 15 | 15 | 15 | 15 | 15 | 15 | 15 | 15 |
|  |  | Antimony trioxide |  |  |  |  |  |  |  |  |  |  | 3 |
|  |  | Tin sulfide | 3 | 3 | 3 | 3 | 3 | 3 | 3 | 3 | 3 | 3 | — |
|  |  | Calcium hydroxide | 3 | 3 | 3 | 3 | 3 | 3 | 2 | 7 | 3 | 3 | 2 |
|  |  | Sodium carbonate | 1 | 1 | 1 | 1 | 1 | 0.8 | 1 | 1 | 0.5 | 1.6 | — |
|  |  | Barium sulfate | 33 | 37 | 31 | 35 | 29 | 33.2 | 34 | 29 | 33.5 | 32.4 | 33 |
|  | Fiber substrate | Copper fiber (metal fiber) |  |  |  |  |  |  |  |  |  |  | 5 |
|  |  | Iron fiber (metal fiber) | 4 | — | 6 | 3 | 3 | 3 | 4 | 4 | 4 | 4 | 4 |
|  |  | Aramid fiber (Organic fiber) | 3 | 3 | 3 | 3 | 3 | 3 | 3 | 3 | 3 | 3 | 3 |
|  |  | Mineral fiber (Inorganic fiber) | 5 | 5 | 5 | 5 | 5 | 5 | 5 | 5 | 5 | 5 | 5 |
|  | Metal powder | Zinc powder | 1 | 1 | 1 | — | 6 | 6 | 1 | 1 | 1 | 1 | 2 |
| Results of measurement and evaluation | Porosity | (%) | 10 | 10 | 10 | 10 | 10 | 20 | 10 | 10 | 10 | 10 | 10 |
|  | Friction coefficient during high speed and high temperature braking |  | 0.26 | 0.21 | 0.22 | 0.23 | 0.17 | 0.25 | 0.27 | 0.19 | 0.26 | 0.19 | 0.27 |
|  |  |  | A | B | B | B | C | A | A | C | A | C | A |
|  | Coefficient of static friction |  | 0.36 | 0.27 | 0.38 | 0.34 | 0.34 | 0.34 | 0.34 | 0.35 | 0.35 | 0.34 | 0.36 |
|  |  |  | A | C | A | A | A | A | A | A | A | A | A |
|  | Amount of abrasion of pad at 400° C. | (mm) | 1.23 | 0.75 | 1.85 | 1.25 | 1.68 | 1.35 | 1.35 | 1.45 | 1.24 | 1.75 | 0.92 |
|  |  | — | B | A | C | B | C | B | B | B | B | C | A |
|  | Strength of sticking due to rust | (N) | 123 | 44 | 154 | 137 | 0 | 112 | 105 | 0 | 112 | 0 | 52 |
|  |  | — | C | B | C | C | A | C | C | A | C | A | B |

*The unit of the amount blended is part(s) by mass.

In Examples 1 to 7, the friction coefficient during high speed and high temperature braking, the coefficient of static friction, the abrasion resistance at 400° C. and the effect of preventing sticking due to rust are comparable to those of Reference Example 1 containing copper and antimony trisulfide. By contrast, any of the friction coefficient during high speed and high temperature braking, the coefficient of static friction, the abrasion resistance at high temperature and the effect of preventing sticking due to rust was rated as "C" in Comparative Example 1 in which silicone-containing phenolic resin (resin A) was not used, in Comparative Example 2 which does not contain iron fiber, Comparative Example 3 in which the content of iron fiber is more than 5% by mass, Comparative Example 4 which does not contain zinc powder, Comparative Example 5 and Comparative Example 6 in which the content of zinc powder is more than 5% by mass (in Comparative Example 6 the porosity is more than 18%), Comparative Example 7 in which the content of calcium hydroxide is less than 2.5% by mass, Comparative Example 8 in which the content of calcium hydroxide is more than 6% by mass, Comparative Example 9 in which the content of sodium carbonate is less than 0.7% by mass, and Comparative Example 10 in which the content of sodium carbonate is more than 1.5% by mass.

INDUSTRIAL APPLICABILITY

The friction material composition of the present invention has higher friction coefficient during high speed and high temperature braking, higher coefficient of static friction than, and superior abrasion resistance at high temperature to conventional products, and is less likely to cause sticking due to rust compared therewith, even without using environmentally harmful copper or antimony compounds. Thus, the friction material composition of the present invention is suitable for a friction material such as automobile brake pads for which the function of parking brake is also required, and a friction member.

The invention claimed is:

1. A friction material composition comprising a bonding material comprising a silicone-containing phenolic resin, an organic filler, an inorganic filler comprising calcium hydroxide, sodium carbonate, graphite, zirconium oxide, and metal sulfide, and a fiber substrate comprising iron fiber, wherein the friction material composition comprises no copper element, or comprises less than 0.5% by mass of copper element if any,
comprises no antimony element,
comprises iron fiber and the content thereof is 5% by mass or less,
comprises 1 to 5% by mass of zinc powder,
comprises 2.5 to 6% by mass of calcium hydroxide,
comprises 0.7 to 1.5% by mass of sodium carbonate,
comprises 5 to 20% by mass of silicone-containing phenolic resin,
comprises 0.5 to 20% by mass of graphite,
comprises 5 to 20% by mass of zirconium oxide, and
comprises 0.1 to 10% by mass of metal sulfide,
wherein a content of the organic filler is 1 to 20 mass % and a content of the fiber substrate is 5 to 40 mass %.

2. The friction material composition according to claim 1, wherein the content of the iron fiber is 0.5 to 5% by mass.

3. The friction material composition according to claim 1, comprising cashew particles as the organic filler.

4. The friction material composition according to claim 1, comprising a rubber ingredient as an organic filler.

5. The friction material composition according to claim 1, comprising at least one selected from the group consisting of titanate, zirconium oxide, graphite and metal sulfide as the inorganic filler.

6. A friction material prepared by molding the friction material composition according to claim 1.

7. The friction material according to claim 6, wherein the friction material has a porosity of 5 to 18%.

8. A friction member comprising the friction material according to claim 7 and a back metal.

9. The friction material composition according to claim 1, wherein the bonding material comprises silicone-containing phenolic resin and another bonding material.

10. The friction material composition according to claim 9, wherein the another bonding material comprises at least one selected from the group consisting of acrylic rubber-containing phenolic resin, cashew-modified phenolic resin, epoxy-modified phenolic resin and alkyl benzene-modified phenolic resin.

11. The friction material composition according to claim 10, wherein a content of the bonding material in the friction material composition is 5 to 15% by mass.

12. The friction material composition according to claim 10, wherein a content of the bonding material in the friction material composition is 5 to 10% by mass.

13. The friction material composition according to claim 10, wherein a content of the silicone-containing phenolic resin in the friction material composition is 5 to 15% by mass.

14. The friction material composition according to claim 10, wherein a content of the silicone-containing phenolic resin in the friction material composition is 5 to 10% by mass.

15. The friction material composition according to claim 1, wherein a content of the silicone-containing phenolic resin in the friction material composition is 5 to 15% by mass.

16. The friction material composition according to claim 1, wherein a content of the silicone-containing phenolic resin in the friction material composition is 5 to 10% by mass.

17. The friction material composition according to claim 1, wherein a content of the bonding material in the friction material composition is 5 to 20% by mass.

18. The friction material composition according to claim 1, wherein a content of the bonding material in the friction material composition is 5 to 15% by mass.

19. The friction material composition according to claim 1, wherein a content of the bonding material in the friction material composition is 5 to 10% by mass.

* * * * *